Figure 1:
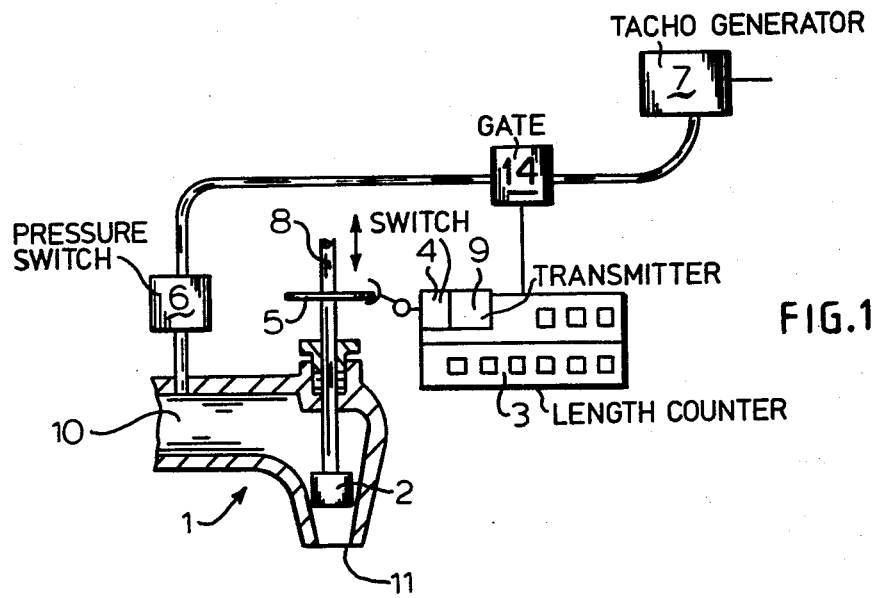

United States Patent [19]

Hofmann

[11] Patent Number: 4,470,149

[45] Date of Patent: Sep. 4, 1984

[54] DEVICE FOR MEASURING THE LENGTH OF ROAD MARKING LINES

[75] Inventor: Frank Hofmann, Hamburg, Fed. Rep. of Germany

[73] Assignee: Walter Hofmann Maschinenfabrik, Rellingen, Fed. Rep. of Germany

[21] Appl. No.: 358,081

[22] Filed: Mar. 15, 1982

[51] Int. Cl.³ .............................................. G06M 3/02
[52] U.S. Cl. ......................................... 377/2; 377/21; 377/24
[58] Field of Search ........................... 377/21, 24, 1, 2

[56] References Cited

U.S. PATENT DOCUMENTS 3,809,864 5/1974 Sampey .................................. 377/2
3,976,989 8/1976 Smith .................................... 377/2

Primary Examiner—John S. Heyman
Attorney, Agent, or Firm—Collard, Roe & Galgano

[57] ABSTRACT

A device for counting or measuring the length of road marking lines or for a total counting of road marking line segments on roads or the like, characterized in that the control or the switching on or off counters of a known type is carried out by the application device, e.g., a spray gun for making the road marking lines.

8 Claims, 2 Drawing Figures

DEVICE FOR MEASURING THE LENGTH OF ROAD MARKING LINES

The invention relates to a device for measuring the length of road marking lines or for producing a count of road marking line segments on roads or the like.

The known electronic operating measuring systems, so-called "meter counters", for the continuous total length counting of only the partial segments of the marking material do not provide sufficient exactness, so that the measuring results could not be used heretofore for obtaining an accounting of the expenses of the contractor of the marking job.

The reason for this is the direct coupling of the measuring system, in the following called a "meter counter" as it is normally called in the marking technology, which normally is present as an adding pulse transmitter with a preselection counter with which the length of the individual partial segments of an interrupted traffic marking line is preselected.

Usually, an electronic length control device comprises at least two preselection counters—namely, one for the length preselection of the traffic line partial segment and one for the length preselection of the traffic marker line interruptions which selectively count the pulses generated by a pulse generator until reaching the given preselection. When reaching the preselection of a counter, the accumulated counter contents are cancelled and the pulse transmitter is switched to the other preselection counter. During each switching over from the one to the other, a signal is generated which is used for the switching on or switching off of the application device for the marking material, called "spray guns" hereinafter.

The pulse generator is driven off the road which has to be provided with the traffic marker line. When correctly designed and correctly adjusted, one unit of the preselection counter corresponds exactly to one road path unit.

For the following explained reasons, the length adjusted in the preselection counter does not correspond to the actual length of the traffic marker line segments generated on the roadway, so that also the total length counting of the meter counter does not conform with the actual total length of the traffic marker segments. A conformity would be merely coincidental.

The reason for the missing conformity is caused by the successive switching of electronic, pneumatic and mechanical systems. The determination of a physical dimension by means of a direct use of primary signals, which are reflected only by a dissipative conversion through other energy systems in the dimension to be determined, must be erroneous. In the known electronic control systems for the partial segments of the interrupted traffic marker lines, a signal which is generated (triggered) by the preselection counter is at first amplified and is then used to actuate a pneumatic valve electromagnetically. With this valve, the pneumatic cylinder of the marking material application device is vented or relieved. With the pneumatic cylinder, the valve of the application device is first opened or closed, which, when the application device is a spray gun, consists of a nozzle and a closing pin.

Delays occur during each conversion from one energy type into another, so that between the electronic signal and opening or closing of the application device a certain time period passes. The delay, for example, at the beginning of the traffic marker line, is larger, the slower the mode of operation of the electromagnetic valve, the smaller the air pressure for actuating the pneumatic cylinder, the larger the volume of the pneumatic cylinder and the larger the lifting strokes are during movements.

However, the fact that delays do occur is not so important. But rather, what is important is the fact that delays are different at the beginning of a traffic marker line segment than at the end of a traffic marker line segment. If the delays would be uniform, the actual length of the traffic marker line segment would conform with the adjustment of the preselection counter, provided that the pulse distance or spacing of the pulse generator is correctly adjusted with respect to the road traveling unit.

Normally, pneumatic single or double-acting cylinders are used for opening and closing of the device applying the marking material which are supported by the force of a spring in the stroke direction and therefore have a different stroke delay in the one stroke direction than in the other stroke direction.

The deviation of the preselection adjustment and the actual length of the traffic marker line segment caused by the different delay during the opening and closing of the application device is even more pronounced by the influence of the vehicle speed with respect to the deviation. Since during the speed changes, due to the time constancy of the delay (at an otherwise unchanged machine adjustment) the delay with respect to the travelled path changes accordingly, the difference between the two delays with respect to the travel path also changes accordingly proportional to the speed. This means that at different speeds, correspondingly different deviations of the preselection counter adjustment from the actual length of the traffic marker segment line are present.

From the foregoing, it is clear that the preselection counter adjustment is not suitable for determining the total length of the traffic marker line segment.

The subject invention seeks to overcome the aforementioned disadvantages and, in particular, it is an object of the invention to provide a device with which the actual beginnings and ends of the traffic marker lines or traffic marker line segments, i.e., their length or total lengths can be exactly determined, and to provide a device which is very simple in its structure.

For solving this object of the invention it is proposed in accordance with the invention not to carry out the control or the switching on and switching off of the adding total length counter by the preselection counters of the length control device as done heretofore in the devices of the aforementioned type, but rather, by the application device which makes the traffic marker lines, for example, by the spray gun of the road marking vehicles.

For this purpose, the application device should be provided with a contact switch or a signal transmitter which is actuated directly by the closing or locking member for the application nozzle, e.g., in paint spray guns, by means of the needle. The times of contact of such a contact switch or the signals of a signal transmitter correspond to the actual beginning and end of the traffic marker line segments. The use of a contact switch permits an extremely simple structure of the metering device, in particular, when the contact switch serves to generate or interrupt the connection between a pulse transmitter, which during the forward movement of the machine generates pulses in accordance with the travelled path units, and an adding total length counter. When using a signal transmitter, which preferably is designed as an inductively-operating element, the signals are used to generate the connection between the pulse transmitter and the total length counter by means of a further switching element.

It is to be understood that the result is more exact if the pulse distance or spacing is more exact with respect to the travel path unit.

Since the opening process, up to the complete opening of the discharge nozzle, and also the closing process extend over a certain span of time, a transmission zone thickness is generated at the beginning and at the end of a traffic marker line segment varying from zero to the complete coating thickness. The length of this transmission zone is dependent on the opening or closing speed of the closing member of the application device and also on the speed of the vehicle.

With respect to taking into consideration this transmission zone, different objects are the result when determining the total length. These requirements range from a complete picking up of this transmission zone or to neglecting it completely. With respect to the applied marking material volume, the metering of the length from the center of the transmission zone at the start of the traffic marker line to the center of the transmission zone at the end of the traffic marker line would be the correct consideration of the transmission zone.

In order to meet the different requirements, the contact switch or the signal transmitter should be mounted in a stepless adjustable manner, in accordance with a further embodiment of the invention, so that a contact can be generated, or a signal can be generated, dependent on the adjustment in each position between the closed or totally opened position of the closing member.

However, there are other possibilities for performing the switching on and switching off of the length counter either from a secondary portion or part of the marking machine or even by the result itself—namely, the applied traffic marker line.

For example, a flow sensor may be provided in the application device or in the supply line for the marking material with the assistance of which a connection between the pulse transmitter and counter is generated only if a marking material flow is present, i.e., while applying a traffic marker line. This embodiment is advantageous with respect to the first possibility in that the counter is not switched during the opening and closing of the application device, but only when, in addition, the marking material actually flows from the application device. When using the first embodiment with only one contact switch on the closing element of the application device, there would be the possibility of length counting, even if no marking material discharges from the application device, so that the danger exists that larger lengths are measured than were actually marked. However, in order to make such a device operable for acknowledgement of the metered results by state contractors for road markings, the structure of the device must be such that the metering result is not too high in any case, but rather somewhat lower. This requirement is met by the second embodiment, wherein a flow sensor is used. Naturally, the first embodiment may be combined with the second one.

A further embodiment consists in that the switching on and switching off of the counter may be carried out with the assistance of a photocell which is directed onto the traffic marker line being generated by the application device. A longitudinal or linear counting occurs only if a traffic line is indeed generated.

Due to the high requirements of measuring exactness, the pulse transmitter cannot be coupled with the air-filled wheels of the vehicle, since during different loads and different inner air pressures such wheels have a different roll-off radius, so that the pulse transmitter must be driven by a rigid metering wheel which rolls on the roadway. However, such a metering wheel can be easily turned manually during the idleness of the device for the purpose of deception concerning the actual use of the machine. In order to prevent such a misuse or at least to make it more difficult, at least one of the four wheels of the machine is provided with a tacho generator, for example, which generates a voltage for releasing the counting pulses only at a forward movement of the machine. A load-dependent cycle switch should be mounted on the same wheel which drives the tacho generator which releases a connection between the pulse transmitter and the counter device only when the corresponding wheel of the machine is loaded, i.e., is in contact with the roadway.

On the other hand, a counting should only occur if marking material is actually applied onto the roadway. This means that an opening and closing of the application device alone should not be sufficient for a counting of pulses.

Therefore, in order to make sure that a counting occurs only when marking material discharges from the application nozzle, the difference between the pressure of the marking material at the closed application nozzle, i.e., when the marking material is in a rest position, and the pressure during the opened application nozzle, i.e., when the marking material flows, should be used with the assistance of a pressure switch.

Such a longitudinal metering device can be used not only for determining the total length of the traffic marker line segments which were applied during a certain time period, but also can be used for the control of the individual length of the traffic marker line segments by adding a further counting device. If a counter, which is in the zero condition is switched by manual manipulation of a key for the time period of the application for only one traffic marker segment, one can determine the length of a single traffic marker line segment. In view of such a longitudinal metering of a partial piece of an interrupted traffic marker line, one is able to correct the longitudinal control device accordingly. Thereby, a stopping of the machine and a time consuming manual measuring on individual traffic line segments is eliminated.

Other objects and features of the present invention will become apparent from the following detailed description considered in connection with the accompanying drawing, which discloses one embodiment of the invention. It is to be understood that the drawing is to be used for the purposes of illustration only, and not as a definition of the limits of the invention.

Figure 2:
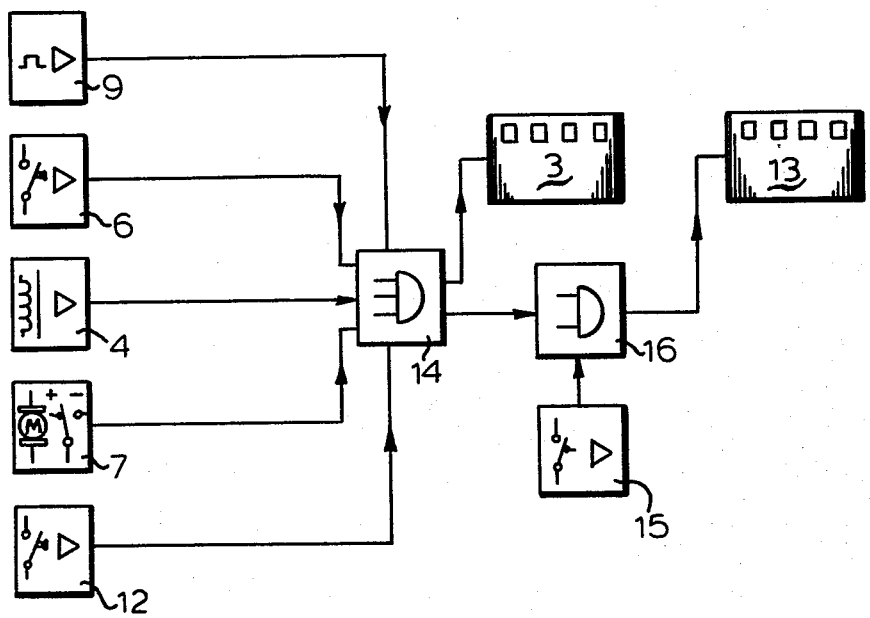

In the drawing, wherein similar reference characters denote similar elements throughout the several views:

FIG. 1 is a partially-schematically-illustrated sectional view of the apparatus embodying the present invention; and FIG. 2 is a block diagram of the electrical circuit associated with the apparatus.

Referring now in detail to the drawing, an application device 1 is provided, in this case a spray nozzle 11 with a supply line 10 for the marking material and the sprayed air. Nozzle 11 can be opened and closed by means of a locking or closing member 2. Closing member 2 has an associated actuating rod 8 on which is mounted a lever or collar part 5 which, during the actuation of the rod 8 or the closing member 2, actuates switch 4. This switch can actuate a pulse transmitter 9 for a longitudinal or length counter 3 whose voltage is generated by a tacho generator 7, thus triggering a counting process during the opening and closing of nozzle 11. So that the counting process can occur only during a discharge of marking material from the nozzle, a pressure switch 6 is mounted on the supply line 10 and is so connected with the length counter that the lowering of pressure in line 10 during opening of nozzle 11 is used to switch on the counting mechanism.

The attachment of the pulse transmitter 9, the tacho generator 7 with forward recognition, the pressure switch 6 or the flow control sensor in the supply line 10 to gun 1, the contact switch 4 on the gun and the load switch 12 on the wheel at which the tacho generator 7 is mounted are shown in FIG. 2 in the form of a circuit diagram, in addition to the length counter. A gate 14 is coupled in series in front of the total line length counter 3 and, in front of the individual line length counter 13, a further gate 16 is coupled in series which is actuated by a switch 15 for the individual line length metering.

While only one embodiment of the present invention has been shown and described, it is obvious that many changes and modifications may be made thereunto without departing from the spirit and scope of the invention.

What is claimed is:

1. A device for counting or measuring the length of road marking lines or for a total counting of road marking line segments on roads, comprising:

application means for making road marking lines including a spray gun having a movable closing element for activating and deactivating said spray gun and an activation means directly operable by said closing element; and at least one counter for monitoring the application of road markings on a road, said counter having switch-on and switch-off means activated by said activation means of said application means.

2. The device of claim 1, wherein said activation means comprises a contact switch.

3. The device of claim 1, wherein said activation means comprises a signal transmitter.

4. The device of claim 2, additionally including a pulse transmitter coupled to said counter and wherein said contact switch serves to alternately generate and interrupt the connection between said pulse transmitter and said counter.

5. The device of claim 3, additionally including a pulse transmitter coupled to said counter and wherein said signal transmitter in conjunction with a switch element serves for providing the connection between said pulse transmitter and said counter.

6. The device according to claim 4 or 5, wherein said application means includes a marking material supply line and wherein a flow control switch is provided in said supply line which prevents the feeding of pulses to the counter when the marking material does not flow.

7. The device according to claim 4 or 5, wherein said application means includes a marking material supply line and wherein a pressure switch is provided in said supply line which prevents the feeding of pulses to the counter when the marking material does not flow.

8. The device of claim 4 or 5, wherein said application means has wheels and wherein said means for stopping is a tacho generator, which is coupled with at least one of said wheels, whose current, which is generated only during a forward movement, is used to act through a switch element into the toll circuit in such a manner that the pulses generated at the pulse transmitter at an actuated contact switch and pressure switch are fed to the counter, and which additionally includes means for stopping the feeding of pulses generated by said pulse transmitter to said counter when said application means is in a stationary position.

* * * * *